(12) United States Patent
Gantenbein et al.

(10) Patent No.: US 11,738,359 B2
(45) Date of Patent: Aug. 29, 2023

(54) FOAM DISPENSING GUN WITH THIRD STREAM

(71) Applicant: ICP Construction, Inc., Andover, MA (US)

(72) Inventors: Stefan K. Gantenbein, Medina, OH (US); Mojgan Cline, Copley, OH (US); Anthony J. Taylor, Medina, OH (US); Douglas A. Caffoe, Aurora, OH (US); Kerry W. Armes, Norton, OH (US)

(73) Assignee: ICP Construction, Inc., Andover, MA (US)

( * ) Notice: Subject to any disclaimer, the term of this patent is extended or adjusted under 35 U.S.C. 154(b) by 207 days.

(21) Appl. No.: 16/869,890

(22) Filed: May 8, 2020

(65) Prior Publication Data

US 2020/0261931 A1 Aug. 20, 2020

Related U.S. Application Data

(62) Division of application No. 15/277,128, filed on Sep. 27, 2016, now abandoned.

(51) Int. Cl.
| | |
|---|---|
| *B05B 7/04* | (2006.01) |
| *B05B 7/00* | (2006.01) |
| *G01K 11/16* | (2021.01) |
| *G01K 13/02* | (2021.01) |
| *B05B 12/00* | (2018.01) |
| *B05B 15/65* | (2018.01) |
| *B05B 12/10* | (2006.01) |
| *B05B 15/63* | (2018.01) |

(52) U.S. Cl.
CPC .......... *B05B 7/0408* (2013.01); *B05B 7/0025* (2013.01); *B05B 12/00* (2013.01); *B05B 12/0026* (2018.08); *G01K 11/16* (2013.01); *G01K 13/02* (2013.01); *B05B 12/10* (2013.01); *B05B 15/63* (2018.02); *B05B 15/65* (2018.02)

(58) Field of Classification Search
CPC ... B05B 7/0025; B05B 7/0408; B05B 7/0416; B05B 7/1209; B05B 7/2472; B05B 12/002–0026; B05B 12/10; B05B 15/63; B05B 15/65; B29B 7/7419; B29B 7/7438; B29B 7/7447
USPC ......... 239/71, 154, 304, 407, 416–415, 417, 239/428, 432, 526–528
See application file for complete search history.

(56) References Cited

U.S. PATENT DOCUMENTS

| | | | |
|---|---|---|---|
| 2,635,010 | A | 4/1953 | Sanders et al. |
| 3,146,950 | A | 9/1964 | Lancaster |
| 3,650,479 | A | 3/1972 | Liedberg |
| 3,838,578 | A | 10/1974 | Sakasegawa et al. |

(Continued)

FOREIGN PATENT DOCUMENTS

JP 2009035628 A * 2/2009

OTHER PUBLICATIONS

PCT Search Report with Written Opinion for PCT/US13/52984.
Froth Pak Sell Sheet dated 2014.
Froth Pak Ultra Manual dated 2015.

*Primary Examiner* — Cody J Lieuwen
(74) *Attorney, Agent, or Firm* — Fredrikson & Byron, P.A.

(57) ABSTRACT

A two-component spray gun is illustrated that utilizes a third stream for dispensing at least some, and in some instances all, of the requisite foam precursor reactants and/or blowing agents in combination with the "A" and "B" reactant streams.

18 Claims, 6 Drawing Sheets

(56) References Cited

U.S. PATENT DOCUMENTS

| | | |
|---|---|---|
| 4,169,545 A | 10/1979 | Decker |
| 4,644,014 A * | 2/1987 | Thomson ............ C04B 28/32 |
| | | 523/218 |
| 5,242,115 A | 9/1993 | Brown |
| 5,462,204 A | 10/1995 | Finn |
| 5,529,245 A | 6/1996 | Brown |
| 6,021,961 A | 2/2000 | Brown |
| 6,084,001 A * | 7/2000 | Foreman ............ C09D 175/04 |
| | | 521/163 |
| 6,158,624 A | 12/2000 | Grigg et al. |
| 6,182,868 B1 | 2/2001 | Hurray et al. |
| 6,431,468 B1 | 8/2002 | Brown et al. |
| 7,744,019 B2 * | 6/2010 | Merchant ............ B29B 7/7447 |
| | | 239/411 |
| 8,177,451 B2 | 5/2012 | Park |
| 9,211,552 B2 | 12/2015 | Gantenbein et al. |
| 9,546,037 B1 * | 1/2017 | Armes ............ B05B 12/0026 |
| 2002/0137871 A1 * | 9/2002 | Wheeler, Jr. ............ B29C 44/12 |
| | | 528/44 |
| 2005/0035220 A1 | 2/2005 | Brown |
| 2006/0192033 A1 | 8/2006 | Dansizen et al. |
| 2007/0095939 A1 | 5/2007 | Saunders et al. |
| 2008/0296398 A1 | 12/2008 | Hickman et al. |
| 2009/0306674 A1 | 12/2009 | Chandler |
| 2010/0065130 A1 * | 3/2010 | Swab ............ B05B 15/557 |
| | | 137/170.1 |
| 2014/0005288 A1 * | 1/2014 | Chen ............ C08G 18/06 |
| | | 521/170 |
| 2014/0034756 A1 * | 2/2014 | Gantenbein ............ B29B 7/7438 |
| | | 239/416.1 |
| 2014/0339327 A1 | 11/2014 | Gantenbein et al. |
| 2015/0085601 A1 * | 3/2015 | Hammerlund ............ B05B 7/0018 |
| | | 366/160.1 |
| 2017/0157628 A1 * | 6/2017 | Heckert ............ B05B 7/0025 |

* cited by examiner

FOAM DISPENSING GUN WITH THIRD STREAM

CROSS-REFERENCE TO RELATED APPLICATIONS

The application is a divisional application and claims priority to and fully incorporates by reference, pending Ser. No. 15/277,128 filed 27 Sep. 2016.

TECHNICAL FIELD OF THE INVENTION

The invention described herein relates generally to a two-component spray gun that utilizes a third stream for dispensing at least some, and in some instances all, of the requisite foam precursor reactants and/or blowing agents.

BACKGROUND OF THE INVENTION

This invention is particularly suited for in-situ applications of liquid chemicals mixed and dispensed as a spray or a foam and more specifically, to in-situ application of polyurethane foam or froth. In-situ applications for polyurethane foam have continued to increase in recent years extending the application of polyurethane foam beyond its traditional uses in the packaging, insulation and molding fields. For example, polyurethane foam is being used with increasing frequency as a sealant in the building trades for sealing spaces between windows and door frames and the like and as an adhesive for gluing flooring, roof tiles, and the like.

Polyurethane foam for in-situ applications is typically supplied as a "one-component" froth foam or a "two-component" froth foam in portable containers hand carried and dispensed by the operator through either a valve or a gun. However, the chemical reactions producing the polyurethane froth foam in a "one-component" polyurethane foam is significantly different from the chemical reactions producing a polyurethane froth foam in a "two-component" polyurethane foam. Because the reactions are different, the dispensing of the chemicals for a two-component polyurethane foam involves different and additional concepts and concerns than those present in the dispensing apparatus for a "one-component" polyurethane froth foam.

A "one-component" foam generally means that both the resin and the isocyanate used in the foam formulation are supplied in a single pressurized container and dispensed from the container through a valve or a gun attached to the container. When the chemicals leave the valve, a reaction with moisture in the air produces a polyurethane froth or foam. Thus, the design concerns related to an apparatus for dispensing one-component polyurethane foam essentially concerns the operating characteristics of how the one-component polyurethane foam is throttled or metered from the pressurized container. Post drip is a major concern in such applications as well as the dispensing gun not clogging because of reaction of the one component formulation with air (moisture) within the gun. To address or at least partially address such problems, a needle valve seat is typically applied as close to the dispensing point by a metering rod arrangement which can be pulled back for cleaning. While metering can occur at the needle valve seat, the seat is primarily for shut-off to prevent post drip, and depending on gun dimensioning, metering may principally occur at the gun opening.

In contrast, a "two-component" froth foam means that one principal foam component is supplied in one pressurized container, typically the "A" container (i.e., polymeric isocyanate, fluorocarbons, etc.) while the other principal foam component is supplied in a second pressurized container, typically the "B" container (i.e., polyols, catalysts, flame retardants, fluorocarbons, etc.). In a two-component polyurethane foam, the "A" and "B" components form the foam or froth when they are mixed in the gun. Of course, chemical reactions with moisture in the air will also occur with a two-component polyurethane foam after dispensing, but the principal reaction forming the polyurethane foam occurs when the "A" and "B" components are mixed or contact one another in the dispensing gun and/or dispensing gun nozzle. The dispensing apparatus for a two-component polyurethane foam application has to thus address not only the metering design concerns present in a one-component dispensing apparatus, but also the mixing requirements of a two-component polyurethane foam.

Further, a "frothing" characteristic of the foam is enhanced by the pressurized gas employed, e.g., fluorocarbon (or similar) component, which is present in the "A" and "B" components. This fluorocarbon component is a compressed gas which exits in its liquid state under pressure and changes to its gaseous state when the liquid is dispensed into a lower pressure ambient environment, such as when the liquid components exit the gun and enter the nozzle.

While polyurethane foam is well known, the formulation varies considerably depending on application. In particular, while the polyols and isocyanates are typically kept separate in the "B" and "A" containers, other chemicals in the formulation may be placed in either container with the result that the weight or viscosity of the liquids in each container varies as well as the ratios at which the "A" and "B" components are to be mixed. In dispensing gun applications which relate to this invention, the "A" and "B" formulations are such that the mixing ratios are generally kept equal so that the "A" and "B" containers are the same size. However, the weight, more importantly the viscosity, of the liquids in the containers invariably vary from one another. To adjust for viscosity variation between "A" and "B" chemical formulations, the "A" and "B" containers are charged (typically with an inert gas) at different pressures to achieve equal flow rates. The metering valves in a two-component gun, therefore, have to meter different liquids at different pressures at a precise ratio under varying flow rates. For this reason (among others), some dispensing guns have a design where each metering rod/valve is separately adjustable against a separate spring to compensate not only for ratio variations in different formulations but also viscosity variations between the components. The typical two-component dispensing gun in use today can be viewed as two separate one-component dispensing guns in a common housing discharging their components into a mixing chamber or nozzle. This practice, typically leads to operator errors. To counteract this adverse result, the ratio adjustment then has to be "hidden" within the gun, or the design has to be such that the ratio setting is "fixed" in the gun for specific formulations. The gun cost is increased in either event and "fixing" the ratio setting to a specific formulation prevents interchangeability of the dispensing gun.

Another element affecting the operation of a two-component gun is the design of the nozzle. The nozzle is typically a throw away item detachably mounted to the nose of the gun. Nozzle design is important for cross-over and metering considerations in that the nozzle directs the "A" and "B" components to a static mixer within the tip. For example, one gun completely divides the nozzle into two passages by a wall extending from the nozzle nose to the mixer. The wall lessens but does not eliminate the risk of cross-over since the higher pressurized component must travel into the mixer and back to the lower pressure metering valve.

A still further characteristic distinguishing two-component from one-component gun designs resides in the clogging tendencies of two-component guns. Because the foam foaming reaction commences when the "A" and "B" components contact one another, it is clear that, once the gun is used, the static mixer will clog with polyurethane foam or froth formed within the mixer. This is why the nozzles, which contain the static mixer, are designed as throw away items. In practice, the foam does not instantaneously form within the nozzle upon cessation of metering to the point where the nozzles have to be discarded. Some finite amount of time must elapse. This is a function of the formulation itself, the design of the static mixer and, all things being equal, the design of the nozzle.

The dispensing gun of the present invention is suited for use in two-component polyurethane foam "kits" typically sold to the building or construction trade. Typically, the kit contains two pressurized "A" and "B" cylinders (130-250 psi), a pair of hoses for connection to the cylinders and a dispensing gun, all of which are packaged in a container constructed to house and carry the components to the site where the foam is to be applied. When the chemicals in the "A" and "B" containers are depleted, the kit is sometimes discarded or the containers can be recycled. The dispensing gun may or may not be replaced. Since the dispensing gun is included in the kit, kit cost considerations dictate that the dispensing gun be relatively inexpensive. Typically, the dispensing gun is made from plastic with minimal usage of machined parts.

Within each type of dispensing gun (e.g., one-component dispensing gun, two-component dispensing gun), a metering rod is utilized. The metering rod is a primary shutoff within the dispensing gun that meters or controls dispensing of material. The metering rod is often referred to as a needle or a pin and engages a female type receiver to meter or shutoff flow of chemical (e.g., material, component "A," component "B," etc.). In one-component dispensing guns, a single metering rod is included within a dispensing passage. In two-component dispensing guns, a metering rod is included within each dispensing passage associated with component (e.g., material). In an embodiment, two-component dispensing gun includes first dispensing passage and respective metering rod and second dispensing passage and respective metering rod. Upon use of a trigger, metering rod(s) allow material to be dispensed.

Fabrication of metering rods for dispensing guns include various challenges to produce an efficient dispensing gun at a reasonable price point. Typically, metering rods are fabricated incorporating brass, copper, and other materials (e.g., metallic, non-metallic, etc.). Yet, such materials have increased in cost and, in turn, increased cost of manufacturing dispensing guns. Furthermore, the dispensing gun requires a secure mating between receiver and metering rod in order to prevent inconsistent metering (e.g., non-uniform dispensing of material, components, or chemical) and incomplete shut off (in a closed position). Inaccuracy between mating surfaces (e.g., receiver and metering rod) is typically overcome by forcing two elements together during initial assembly and allowing the more malleable of the two elements to take set. This technique is referred to as presetting and typically requires lengthy hold time which limits manufacturing of dispensing guns. Overall, presetting increases the possibility of enabling two mating surfaces to have secure connection (e.g., mating) to avoid leakage and/or non-uniform dispensing but adds to the manufacturing time.

Additionally, metallic metering rods are often fabricated with turning or grinding techniques. In particular, during creation of typical metallic metering rod(s), radial micro grooves are present due to such turning or grinding technique. With repeated use over duration of time, these micro grooves cause wear to the more malleable mating surface. In general, micro grooves grind or file away at the mating surface which can cause leakage of chemical/material at the mating surface.

While two-component dispensing guns discussed above function in a commercially acceptable manner, it is becoming increasingly clear as the number of in-situ applications for polyurethane foam increase, that the range or the ability of the dispensing gun to function for all such applications has to be improved. As a general example, metering rods that meter amount of dispensed material need to be fabricated in a manner that prevent uneven dispensing of materials as well as prevent incomplete shutoff.

Further limitations and disadvantages of conventional, traditional, and proposed approaches will become apparent to one of skill in the art, through comparison of such systems and methods with certain embodiments the claimed invention as set forth in the remainder of the present application with reference to the drawings.

SUMMARY OF THE INVENTION

In one embodiment of the invention, a foam spray gun is described in which a third input hose is provided for the spray gun in communication with said removable nozzle for dispensing a liquid or a gas. The gun will have a pivotable trigger for controlling dispensing of the polyol and diisocyanate in the pair of input hoses, and the gun may have a separate control mechanism for controlling dispensing of at least a liquid or gas from the third input hose.

In one aspect of the invention, the removable nozzle is temperature sensitive, although the affixing of a temperature sensitive tape to either the nozzle or at least one of the input hoses is also employed.

In one embodiment of the invention, a foam spray gun is described which includes: a housing having a front and a rear; a removable nozzle at the front of the housing; a pair of input hoses for at least one polyol and at least one diisocyanate, the pair of input hoses in fluid communication with the removable nozzle at one end, the hoses also in fluid communication with a storage container for each of the at least one polyol and at least one diisocyanate at an opposed end, at least one of the at least one polyol and at least one diisocyanate entering the opposed end via a liquid pump; a third input hose in communication with the removable nozzle for dispensing a liquid or a gas blowing agent or combinations thereof; a pivotable trigger for controlling dispensing of the at least one polyol and the at least one diisocyanate in the pair of input hoses, the trigger adjacent a handle; a control mechanism for controlling dispensing of the liquid or gas from the third input hose wherein the control mechanism is either a separate trigger or the pivotable trigger for controlling dispensing of the at least one polyol and the at least one diisocyanate.

The removable nozzle is preferably temperature sensitive changing from a first color to a second color upon a temperature change within the nozzle. Optionally, a temperature sensitive tape is positioned on the nozzle, the pressure sensitive tape changing from a first color to a second color upon a temperature change within the nozzle. In another configuration, at least one of the pair of hoses has a temperature sensitive tape positioned thereupon, the pressure sensitive tape changing from a first color to a second color upon a temperature change within the hose.

In one aspect of the invention, the control mechanism for controlling dispensing from the third hose is positioned on the pivotable trigger, although it is possible that the control mechanism is positioned on a side of a housing of said spray gun or is positioned adjacent a handle of said spray gun.

The foam spray gun typically will have a high/low pivotable control within the gun, the control within a flow path within the gun and post ingress of the at least one polyol and said at least one diisocyanate.

The foam spray gun may have a safety lock biased in a locked position, the lock positioned on a front face of the pivotable trigger for controlling dispensing of the at least one polyol and the at least one diisocyanate.

In another aspect of the invention, the foam spray gun will include: a housing having a front and a rear; a removable nozzle at the front of the housing; a pair of input hoses for at least one pressurized "B-side" polyol and at least one pressurized "A-side" diisocyanate, the pair of input hoses in fluid communication with the removable nozzle at one end, the hoses also in fluid communication with a storage container for each of the at least one pressurized "B-side" polyol and at least one pressurized "A-side" diisocyanate at an opposed end; a third input hose in communication with said removable nozzle for dispensing a pressurized liquid or a pressurized gas or combinations thereof, the third input hose comprising at least one gaseous agent and at least one additional reactant selected from the group consisting of at least one different polyol from the at least one "B-side polyol", at least one plasticizer, at least one flame retardant, at least one surfactant, at least one catalyst, at least one blowing agent, at least one pressurizing inert gas and water; a pivotable trigger for controlling dispensing of said at least one polyol and said at least one diisocyanate in the pair of input hoses, the trigger adjacent a handle; and a control mechanism for controlling dispensing of the liquid or gas from the third input hose wherein the control mechanism is either a separate trigger or the pivotable trigger for controlling dispensing of the at least one polyol and the at least one diisocyanate.

In another embodiment of the invention, at least one additional reactant in the third input hose will be the same as at least one "B-side" reactant.

These and other advantages and novel features of the claimed invention, as well as details of illustrated embodiments thereof, will be more fully understood from the following description and drawings.

DETAILED DESCRIPTION OF THE INVENTION

The best mode for carrying out the invention will now be described for the purposes of illustrating the best mode known to the applicant at the time of the filing of this application. The examples are illustrative only and not meant to limit the invention, as measured by the scope and spirit of the claims.

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

Words written in all capital letters can refer to specific acronyms; specific components, inputs, and/or fields; and/or general components, inputs, and/or fields. Thus, in some cases the word written in all capital letters is interchangeable with the same word written in lower case letters.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

Figure 1:
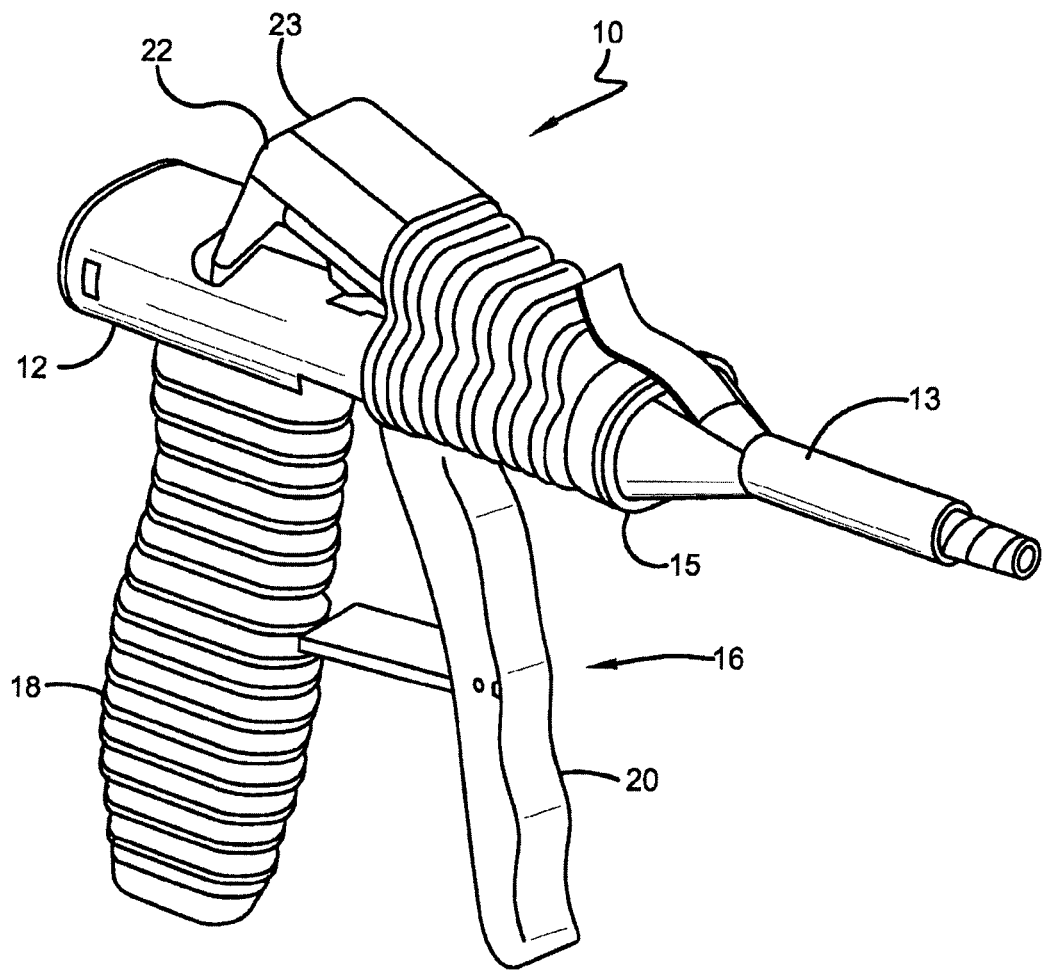
FIG. 1 illustrates a perspective view of a Prior Art dispensing gun.

FIG. 1 illustrates a Prior Art airless two-component dispensing gun 10. Dispensing gun 10 may be viewed as comprising a one-piece gun body 12 (which includes components to be described) with a detachably secured disposable nozzle 13. In one preferred embodiment, the gun is molded from polypropylene and the nozzle is molded from an ABS (Acrylonitrile-Butadiene-Styrene) plastic. It is to be appreciated that any suitable plastic material can be utilized for the dispensing gun 10. While one of the objects of the invention is to provide an inexpensive dispensing gun achieved in part by the molding gun body 12 and nozzle 13 from plastic, the invention in its broader sense is not limited to a dispensing gun molded from any particular plastic and in a broader sense, includes metallic dispensing guns and/or dispensing guns with some metallic components either within portions or components of the housing of the dispensing gun or within portions of the nozzle.

Gun body 12 may be further defined as having integral portions including a longitudinally-extending valve portion 15 to which nozzle 13 is releasably connected and terminating at a longitudinally-extending trigger portion 16, in turn, terminating at longitudinally-extending spring portion (not shown) from which transversely extends handle portion 18. Within gun body housing 12 is a pair of hose openings 22, 23, canted as shown, to which the "A" and "B" hoses (not shown) are attached, respectively, by conventional quick connect couplings or other retaining mechanisms (e.g., friction fitting O-rings). Dispensing gun 10 is also provided with pivotable trigger 20 extending within trigger body portion 16. It should be appreciated that when the operator grasps dispensing gun 10 about handle 18 for finger actuation of trigger 20, that the position of hose openings 22, 23 is such that the kit hoses will drape over the operator's forearm which is preferred over other conventional hose attachment positions on the dispensing gun. Canting hose openings 22, 23 is thus believed to provide some ergonomic benefit while contributing to the improved performance of dispensing gun 10 as described below. While a canted configuration is illustrated, the invention is not limited to that arrangement, and the "A" and "B" hoses may be positioned to enter the gun from the base of handle 18 (not shown) or from the rear (not shown).

Figure 2:
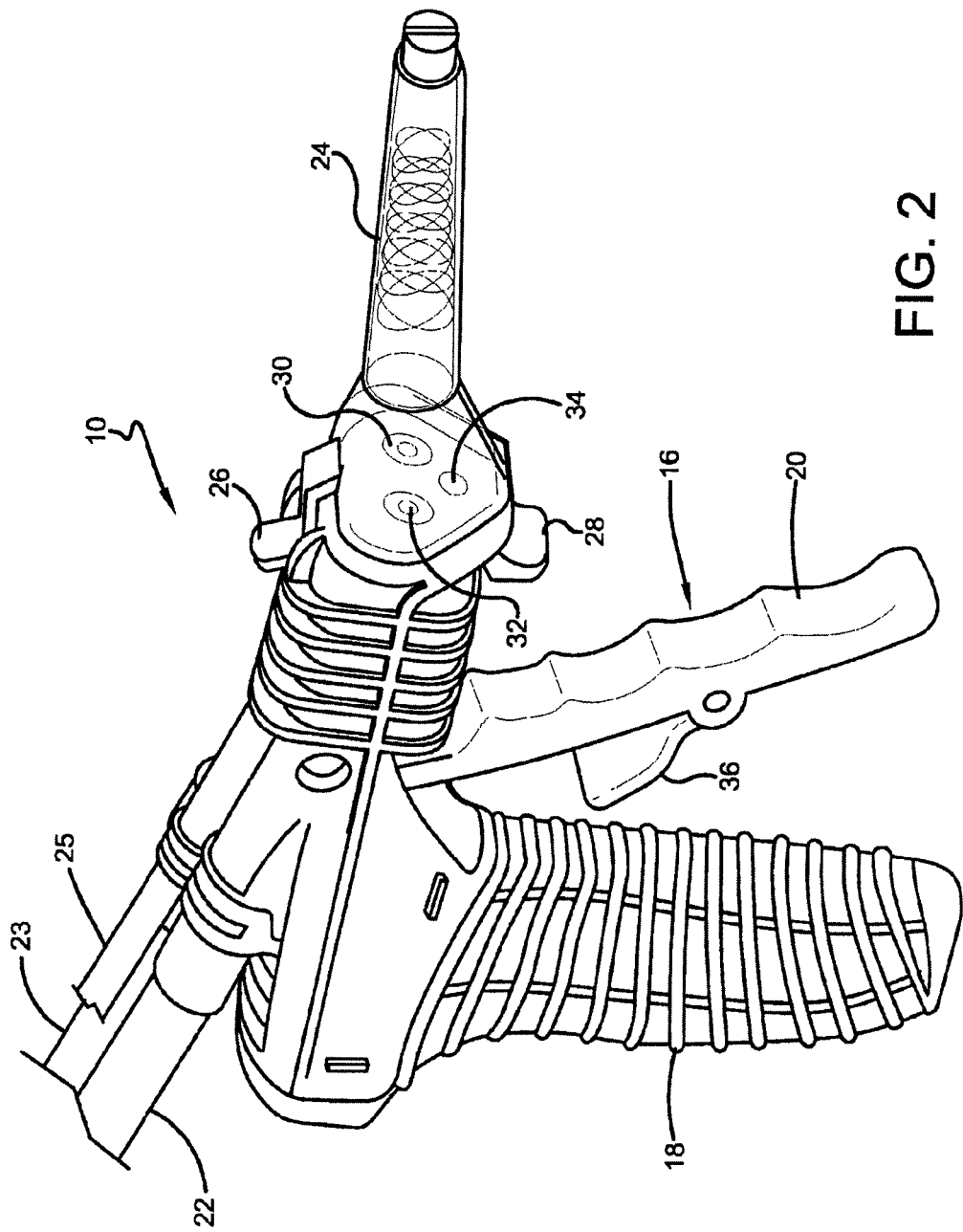
FIG. 2 illustrates a perspective view of one aspect of the invention in which a third stream input is illustrated, third stream control trigger and a temperature sensitive nozzle.

Referring now to FIG. 2, dispensing gun 10 is shown in a manner similar to FIG. 1, in which canting hose openings 22,23 are illustrated to communicate with removable nozzle 24 via openings 32, 30 respectively. Third hose opening 25 also communicates with removable nozzle 24 via opening 34. The value of having a third hose is that the user may supplement the options available through the use of this third hose and by control using third stream control trigger 28, may optionally dispense pressurized air (or other gas) to clean a surface upon which foam is to be applied, or to dispense a liquid cleaning medium through the nozzle (e.g., solvent) or to at least partially dispense a surfactant, a catalyst, a flame retardant, or a liquid or gaseous blowing agent. Wide safety lock 36 is accessed and controlled typically via thumb control by the user. In one aspect of the invention, nozzle 24 is a temperature sensitive nozzle in which the nozzle changes color depending upon the temperature of the dispensed chemicals, thereby permitting the user to visually see if the chemicals are being dispensed at the proper temperature, which at least in part, governs the applied A/B ratio. It is recognized that color-sensitive dyes and pigments may be incorporated into the plastic of nozzle 24.

Figure 3:
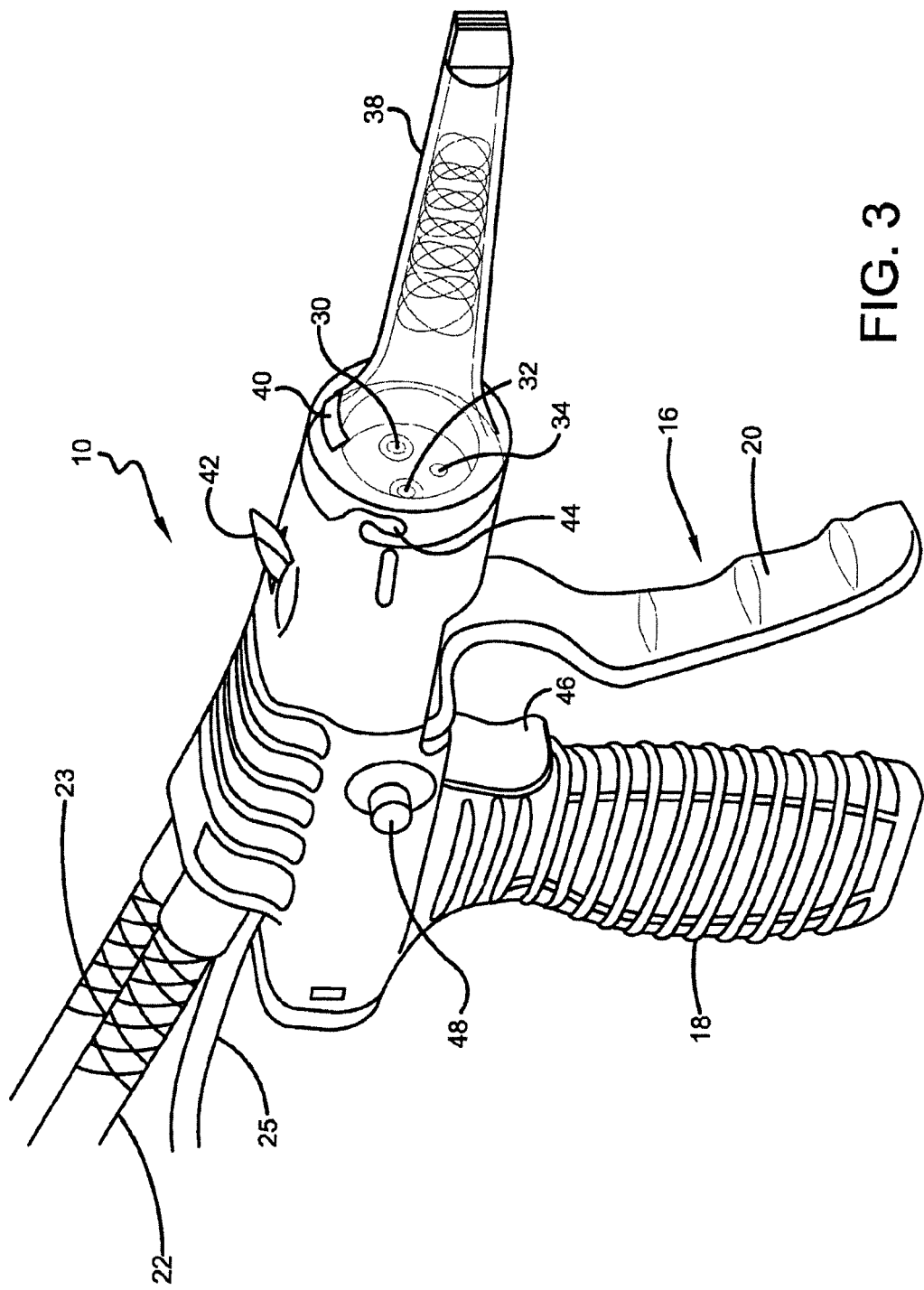
FIG. 3 illustrates a perspective view of one aspect of the invention in which a third stream input is illustrated with corresponding third stream trigger control, high/low output control and twist and "click" nozzle and temperature sensitive tape on the nozzle.
Figure 3A:
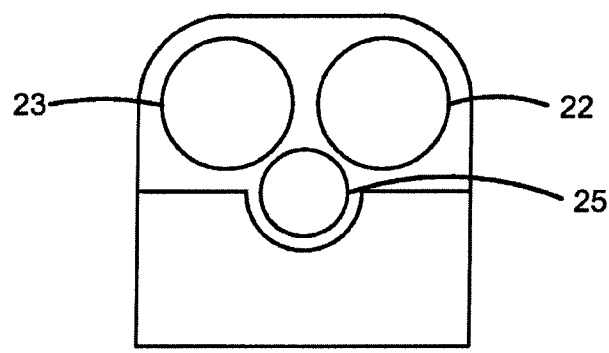
FIG. 3A illustrates a rear elevational view of the nozzle attachment of FIG. 3 showing the third hose positioned below the pair of input hoses.
Figure 3B:
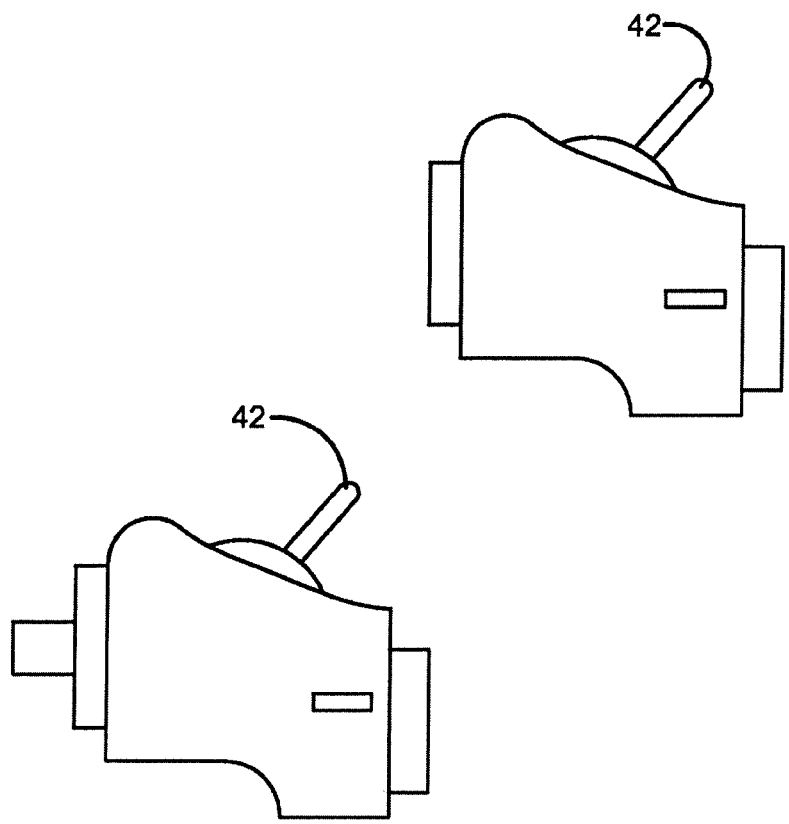
FIG. 3B illustrates a side elevational view of the housing portion of the spray gun of FIG. 3 in which the housing has a high throughput ability as well as a more restricted throughput.

As better illustrated in FIG. 3, dispensing gun 10 is shown in which removable nozzle 38 is affixed by a "twist and click" nozzle 44 and further in which third stream trigger control is provided by pivotable trigger 46 adjacent handle 18. Temperature sensitive tape 40 is affixed to nozzle 38 wherein the tape changes color depending upon the temperature of the dispensed chemicals for the reasons opined in the previous paragraph. The dispensing gun is further provided with high/low output control lever 42 for further control by an operator. As shown in FIG. 3A, the pair of canted openings 22,23 are positioned above the third hose opening 25 whereas FIG. 3B illustrates the high and low volume throughput control of output control lever 42. Further illustrated is safety lock 48 positioned optimally on both sides of spray gun 10.

Figure 4:
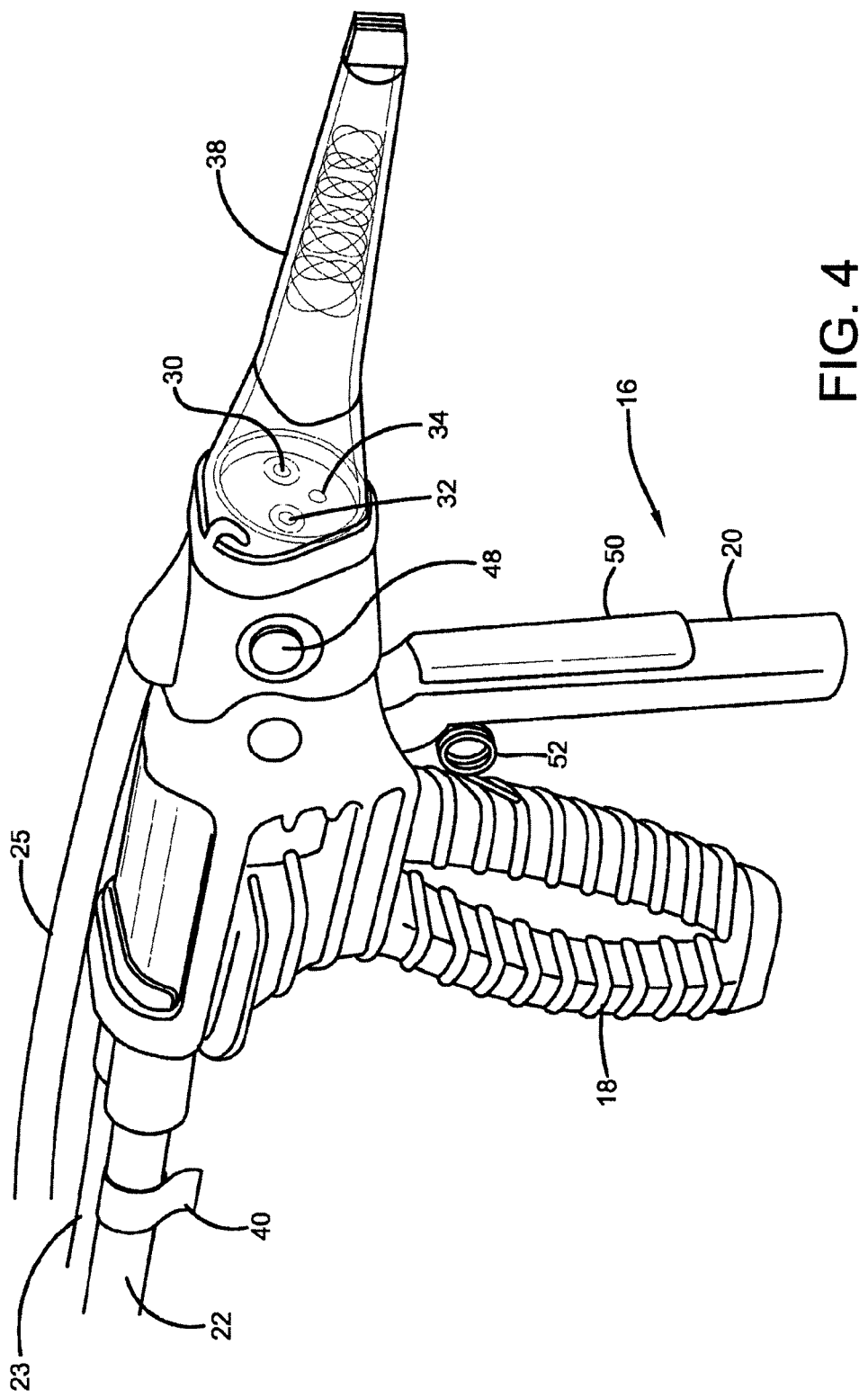
FIG. 4 illustrates a perspective view of one aspect of the invention in which a third stream input is illustrated with temperature sensitive tape on at least one of the input hoses, twist and "click" nozzle, third stream control via a push button on both sides and an "automatic" safety lock.

As shown in FIG. 4, dispending gun 10 is shown in which removable nozzle 38 is affixed by the "twist and click" nozzle 44 of FIG. 3 and further wherein third hose 25 enters adjacent removable nozzle 38. Temperature sensitive tape is affixed to at least one hose 22, more preferably both hoses. Handle 18 is split into two legs, preferably connected at the bottom. Automatic safety lock 50 is positioned upon an exterior-facing side of trigger 50 which is biased in an "off" position by spring-biased trigger 52. Third stream control is effected by push button 48 positioned on both sides of the gun housing.

Figure 5:
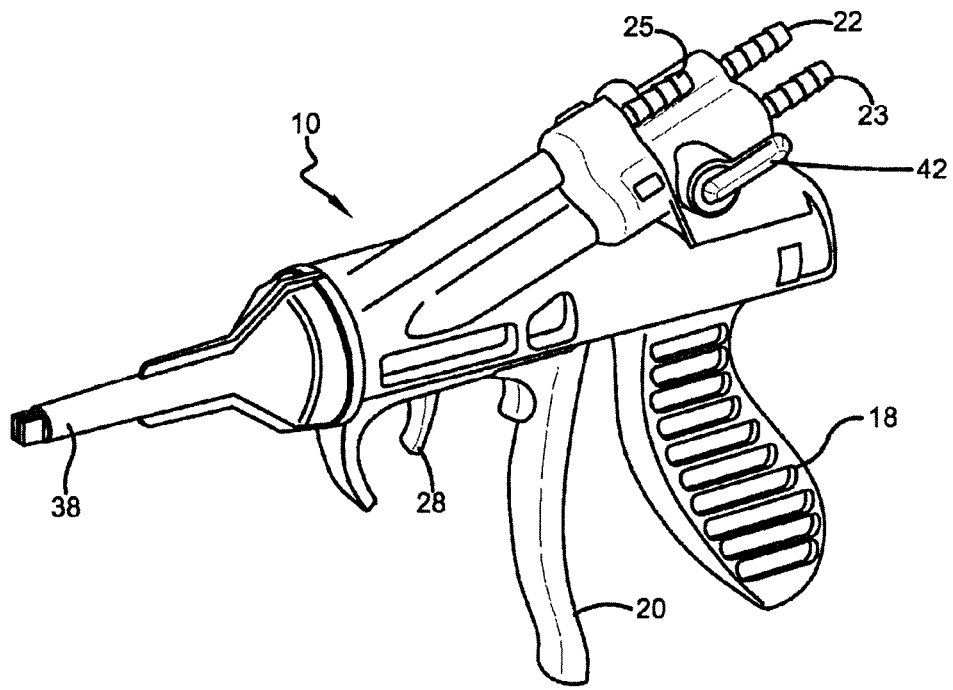
FIG. 5 illustrates a perspective view of the spray gun with a third stream forward of the dispensing trigger.

FIG. 5 illustrates another arrangement of a spray gun and nozzle. As illustrated, spray gun 10 has a pair of canting hose openings 22,23 in communication with removable nozzle 38. Third hose opening 25 also communicates with removable nozzle 38. Safety lock 48 is pivotally positioned within dispensing trigger 20 which is positioned before rearward-sloping curvilinear handle 18. Safety lock 48 is accessed and controlled typically via index finger control by the user. In one aspect of the invention, "twist and click" nozzle 38 is a temperature sensitive nozzle in which the nozzle changes color depending upon the temperature of the dispensed chemicals, thereby permitting the user to visually see if the chemicals are being dispensed at the proper temperature, which at least in part, governs the applied A/B ratio. Third stream trigger 28 is pivotally positioned in front of pivotable dispensing trigger 20 and governs the flow of the fluid (liquid or gas) within the channel of third opening 25. The dispensing gun is further provided with high/low or on/off output control lever 42 for further control by an operator. When used for high/low flow control, different diametered channels are bored into a transverse shaft of control lever 42.

Figure 6:
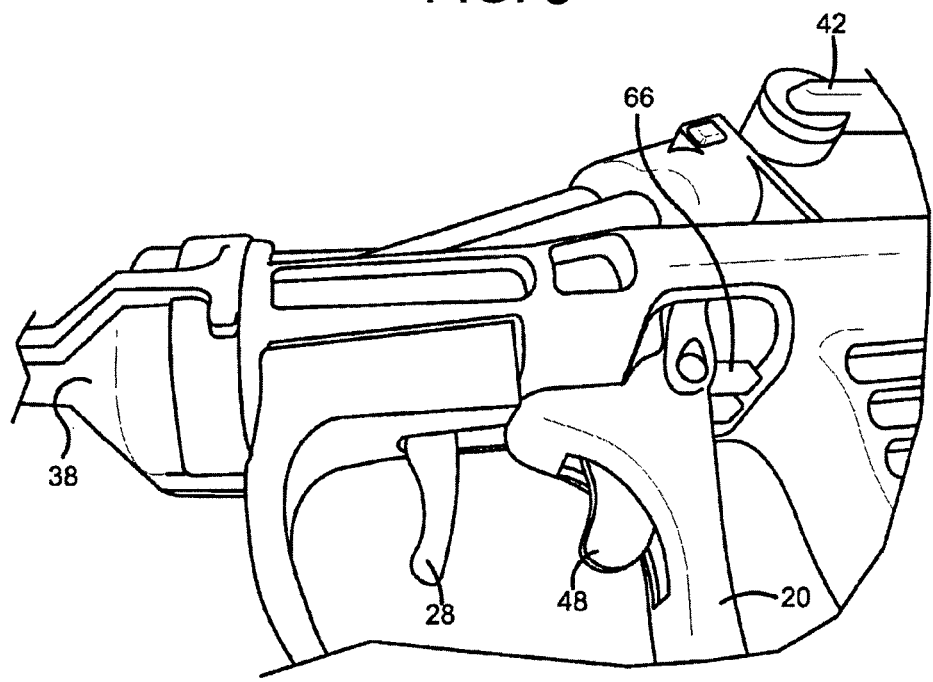
FIG. 6 illustrates an exploded view of the yoke of the safety trigger.

FIG. 6 illustrates yoke 66 of safety lock 48 positioned within dispensing nozzle 20. As illustrated in the figure, safety lock is biased in a forward direction with yoke 66 impinging upon a rear lip. Depressing safety lock 48 pivotally elevates yoke 66 so as to permit rearward movement of pivotable dispensing trigger.

Third Stream Content

The inclusion of a third stream is not only effective for surface cleaning applications, but has applicability to modify the proportions of reactants which are dispensed through the gun, particularly vis-à-vis the contents of the "B" cylinder. For example, current foam dispensing spray guns employ a combination of blowing agent and reactant(s) and typically a pressurizing agent, typically an inert gas in the A/B cylinders. In one aspect of this invention, the amount of blowing agent is reduced (and in some applications eliminated) by introducing the blowing agent, which in some applications may be air, through the third stream input port. The liquid contents of the A/B cylinders are added via the combination of inert gas plus blowing agent vapor pressure. In one aspect of this invention, when the blowing agent is added via the third stream, some or all of the contents of the "B"-side cylinder may be added via a liquid pump positioned on the cylinder.

The application of a third stream allows an end-user to selectively add some, or a portion of, or all of the following chemicals, the list being illustrative and not exhaustive.

Polyols

As illustrated in a non-exhaustive, non-exclusive, exemplary list below, there are a myriad of polyols which are useful in effecting the reaction with a diisocyanate to form a foam having varying characteristics. The ability to add widely varying amounts of polyols and/or different polyol combinations could easily be effected via either supplementing existing amounts of "B-side" polyol(s) via the third stream or by essentially eliminating "B-side" polyol(s) and making their addition via the third stream. In one aspect of the invention, the polyol(s) are added by using a pumping mechanism from a "B-side" cylinder or other container, and the third stream is employed to add the blowing agent and/or pressurizing agent.

Polyester Polyol(s)

PS 2352

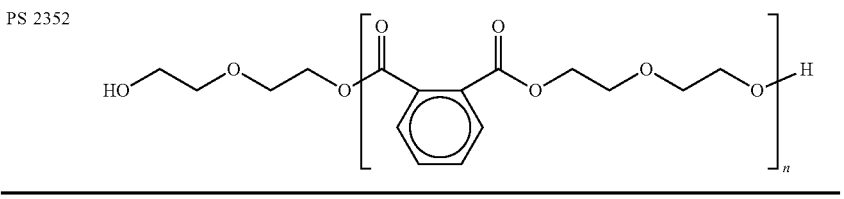

| | |
|---|---|
| Hydroxyl Number, mg KOH/g | 230-250 |
| Water, % by wt., max. | 0.15 |
| Acid Number, mg KOH/g, max. | 0.6-1.0 |
| Viscosity at 77° F. (25° C.), cP | 2,000-4,500 |
| Equivalent Weight (average) | 234 |
| Molecular Weight (average) | 468 |
| Color, Gardner | 4 |
| Density at 77° F. (25° C.), lb/U.S. gal | 9.9 |
| Specific Gravity at 77° F. (25° C.) | 1.19 |

TB-350

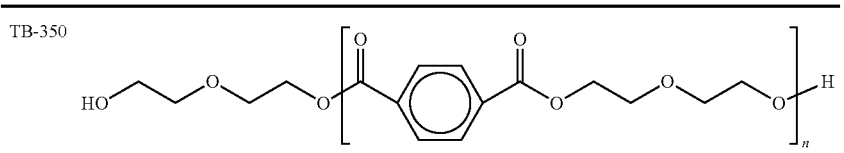

| | |
|---|---|
| Hydroxyl Number, mg KOH/g | 335-365 |
| Water, % by wt., max. | 0.15 |
| Acid Number, mg KOH/g, max. | 0.5-2.0 |
| Viscosity at 77° F. (25° C.), cP | 2,500-3,500 |
| Color, Gardner | 4-5 |
| Specific Gravity at 77° F. (25° C.) | 1.233 |
| Functionality | 2.2 |

Polyether Polyol(s)

Voranol 360

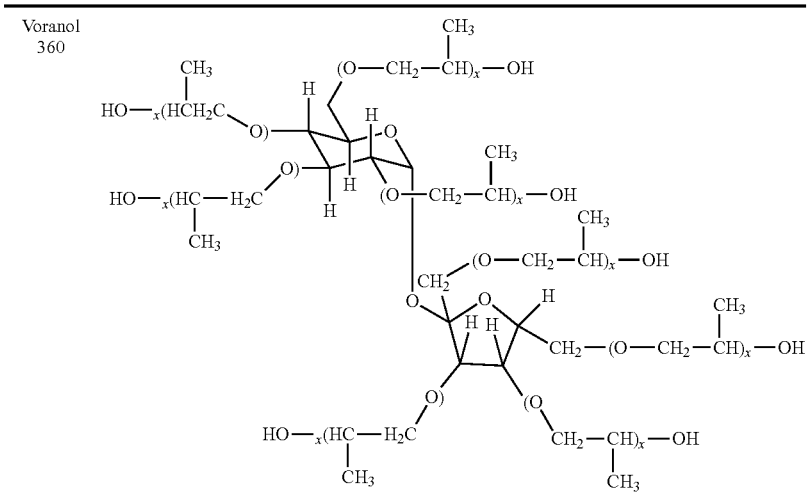

sucrose polyether polyol based on a sucrose-glycerol mixture with a functionality of ~4.5 having a hydroxyl number of ~360

| | |
|---|---|
| Multranol 8114 | aromatic amine-initiated polyether polyol having a hydroxyl number of about 388 mg KOH/g and a functionality of 4 |
| Poly-G® 30-280 | 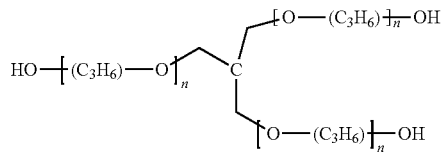<br>glycerine-based oxypropylated polyether polyol having a functionality greater than or equal to 3 and a molecular weight of about 600, an OH number of about 274, an acid number (max) of 0.05, an average pH of about 6.5 |
| Poly-G® 30-168 | 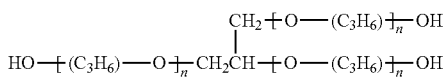<br>1,2,3-propanetriol, methyloxirane polymer |
| Poly-G® 30-42 | Polyether triol having an average molecular weight of ~4,000, an OH number of about 40, an acid number (max) of ~0.03, an average pH of about 5.5 |
| Jeffol® G 31-35 | 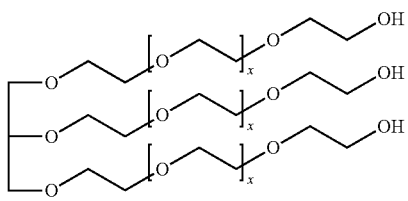<br>ethylene oxide triol, ethylene oxide capped and glycerine initiated wherein the polyol has a hydroxyl number of ~35 and a M.W. of ~4800 and provides for chain entanglement and packing without distorting a profile. |
| Carpol TEAP-265 | <br>3,3',3"-[nitrilotris(ethane-2,1-diyloxy)]tripropan-1-ol |
| Poly-G® 70-600 | 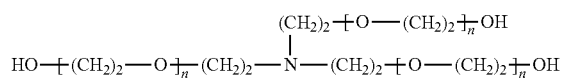<br>Ethoxylatedtriethanolamine |

Flame Retardants and/or Plasticizers

As illustrated in a non-exhaustive, non-exclusive, exemplary list below, there are a myriad of flame retardants and/or plasticizers which are useful in modifying the properties of the reaction of a polyol with a diisocyanate to form a foam having varying characteristics. The ability to add widely varying amounts of flame retardants/plasticizers and/or different flame retardant/plasticizer combinations could easily be effected via either supplementing existing amounts of "B-side" flame retardant(s)/plasticizer(s) via the third stream or by essentially eliminating "B-side" flame retardant(s)/plasticizer(s) and making their addition via the third stream.

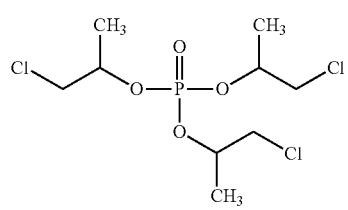

Tris (1-chloro-2-propyl) phosphate ("TCPP")

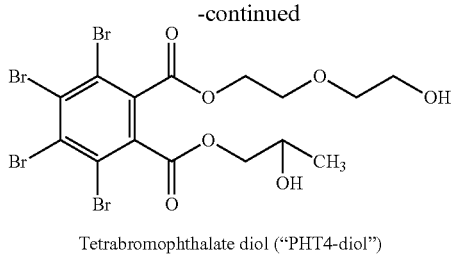

Tetrabromophthalate diol ("PHT4-diol")

Surfactants

As illustrated in a non-exhaustive, non-exclusive, exemplary list below, there are a myriad of surfactants which are useful in modifying the properties of the reaction of a polyol with a diisocyanate to form a foam having varying characteristics. The ability to add widely varying amounts of surfactants and/or different surfactant combinations could easily be effected via either supplementing existing amounts of "B-side" surfactant(s) via the third stream or by essentially eliminating "B-side" surfactant(s) and making their addition via the third stream.

| Trade name | Composition (if known) |
|---|---|
| Tegostab ® B-8433 | Polyether polydimethylsiloxane copolymer |
| Dabco ® LK ®-443 | Non-silicone organic surfactant |
| Nonoxynol-9 | $CH_3(CH_2)_8$—⌬—O—[—]$_{9.5}$OH the hydroxyl number is ~88 |
| L12-8 ethoxylated alcohol (dodecyl alcohol ethoxylate) | $CH_3(CH_2)_{12}$—O—[—O—]$_8$H |

Catalysts

As illustrated in a non-exhaustive, non-exclusive, exemplary list below, there are a myriad of catalysts which are useful in effecting the reaction of a polyol with a diisocyanate to form a foam having varying characteristics. The ability to add widely varying amounts of catalysts and/or different catalyst combinations could easily be effected via either supplementing existing amounts of "B-side" catalyst(s) via the third stream or by essentially eliminating "B-side" catalyst(s) and making their addition via the third stream.

| Trade name and/or Chemical name | Chemical structure |
|---|---|
| Dabco ® K-15 (Potassium octoate/ DEG (diethylene glycol)) | 2-ethylhexanoate potassium salt |
| Polycate ®-12 (Dicyclohexylmethyl amine) | dicyclohexyl-N-methylamine |
| DMDEE (Dimorpholinodiethyl ether) | bis(2-morpholinoethyl) ether |
| Polycate ®-5 (N,N,N',N',N''-pentamethyldiethylenetriamine) | pentamethyldiethylenetriamine |
| Polycate ®-8 (N,N-dimethylcyclohexylamine) | N,N-dimethylcyclohexylamine |

-continued

| Trade name and/or Chemical name | Chemical structure |
|---|---|
| N,N-dimethylhexylamine | $CH_3(CH_2)_4CH_2-N(CH_3)_2$ |
| NEM (N-Ethylmorpholine) | N-ethyl morpholine structure |
| NMM (N-Methylmorpholine) | N-methyl morpholine structure |
| Polycat ® 15 (Tetramethyldipropylene triamine) | $(CH_3)_2N-CH_2CH_2CH_2-NH-CH_2CH_2CH_2-N(CH_3)_2$ |
| DMP (N,N'-Dimethylpiperazine) | 1,4-dimethylpiperazine structure |
| Dabco ® 33LV (1,4-Diazabicyclo[2.2.2]octane) | DABCO structure |
| Dabco ® T (N,N,N'-trimethylaminoethyl ethanolamine) | $(CH_3)_2N-CH_2CH_2-N(CH_3)-CH_2CH_2-OH$ |
| DABCO ® T-120 (dibutyl tin dilauryl mercaptide) | $(CH_3(CH_2)_3)_2-Sn-S(CH_2)_{11}CH_3$ |
| Jeffamine ® D-2000 polyoxypropylenediamine | $H_2N-CH(CH_3)-CH_2-O-[CH_2-CH(CH_3)]_{33.1}-NH_2$ |

Other

Water can be both beneficial and deleterious to catalyst foams, depending on the blowing agent used or the end-use application as illustrated below. For example, block fill foam is a closed cell and requires a high crosslink density in order to be dimensionally stable in the channel, and these characteristics would be an anathema to the window lineal foam, which requires the ability to pack and not distort a window lineal as noted in the following Table. The ability to add widely varying amounts of water could easily be effected via either supplementing existing amounts of "B-side" water via the third stream or by essentially eliminating "B-side" water and making its addition via the third stream.

| "B-side" components | Block Fill foam (preferred) | Window Lineal foam (preferred) |
|---|---|---|
| % water | 1.0% | 10-20% (15%) |
| % catalyst | 2.2% | 0.4-2% (0.5-0.7%) |
| gel time | <1 min. | 2-6 min. (>3 min. <5 min.) |
| "B-side" OHV (polyol only) | 200-400 (300) | 5-20 (8.5) |
| Polyol concentration | 60-65% | 5-10% |
| Pressure Build | irrelevant | important |
| Robustness | sturdy | sensitive |

Blowing Agent(s)

As illustrated in a non-exhaustive, non-exclusive, exemplary list below, there are a myriad of blowing agents which are useful in effecting the reaction of a polyol with a diisocyanate to form a foam having varying characteristics. The ability to add widely varying amounts of blowing agents and/or different blowing agent combinations could easily be effected via either supplementing existing amounts of "A-side" and/or "B-side" blowing agent(s) via the third stream or by essentially eliminating blowing agent(s) and making their addition via the third stream.

In one aspect of the invention, blowing agents having up to four carbon atoms in their backbone and which are useful in this invention fall within the general formula (I) illustrated below:

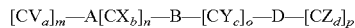

wherein
C is a carbon atom;
V, X, Y & Z are independently selected from the group consisting of H, F and Cl;
a & d are independently selected from the integral values ranging from 0 to 3 inclusive;
b & c are independently selected from the integral values ranging from 0 to 2 inclusive;
o, p & n are equal to 1;
m is selected from the integral values ranging from 0 to 1 inclusive;
A, B & D are covalent bonds sufficient to satisfy the available bonding sites of adjacent carbon atoms, if such carbon atoms are present; and
the blowing agent, including miscible blends and azeotropes thereof, having a boiling point between approximately 5-50° C., and an ozone depletion potential of essentially zero; and
in a preferred embodiment, the blowing agent is non-flammable, recognizing that co-blowing agents may be flammable, although in a more preferred embodiment, the co-blowing agent will be added in such an amount as to render the combination non-flammable either as a blend or as an azeotrope.

In another aspect of the invention, and listed more generically, the blowing agents having up to six carbon atoms in their backbone and which are useful in this invention fall within the general formula (II) illustrated below:

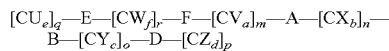

wherein
C is a carbon atom;
U, W, V, X, Y and Z are independently selected from the group consisting of H, F and Cl;
d & e are independently selected from the integral values ranging from 0 to 3 inclusive;
a, b, c & f are independently selected from the integral values ranging from 0 to 2 inclusive;
o, p & n are equal to 1;
m, q & r are independently selected from the integral values ranging from 0 to 1 inclusive;
A, B, D, E and F are covalent bonds sufficient to satisfy the available bonding sites of adjacent carbon atoms, if such carbon atoms are present;
the blowing agent having a boiling point between approximately 5-50° C., and an ozone depletion potential of not greater than 0.05; and
in a preferred embodiment, the blowing agent is non-flammable, recognizing that co-blowing agents may be flammable, although in a more preferred embodiment, the co-blowing agent will be added in such an amount as to render the combination non-flammable either as a blend or as an azeotrope.

As illustrated in a non-exhaustive, non-exclusive, exemplary list below, there are a myriad of blowing agents which are useful in effecting the reaction of a polyol with a diisocyanate to form a foam having varying characteristics. The ability to add widely varying amounts of blowing agents and/or different blowing agent combinations could easily be effected via either supplementing existing amounts of "A-side" and/or "B-side" blowing agent(s) via the third stream or by essentially eliminating blowing agent(s) and making their addition via the third stream.

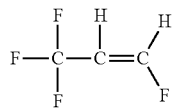

HFO 1234-ze
(1,3,3,3-tetrafluoropropene)

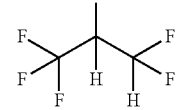

HFC-245fa
(1,1,1,3,3 pentafluoropentane

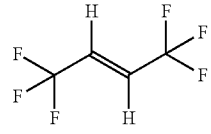

Opteon 1100
(1,1,1,4,4,4 hexafluoro-2-butene)

As used in this application, a non-limiting definition for the term "blowing agent" which includes miscible mixtures and azeotropes of blowing agents, means a propellant or solvent which are useful and provide efficacy to various applications in the form of insulation performance, pressure performance, or solubility, without deleterious effect due to molar gas volume, flammability migration, or GWP reduction, yet which have a vapor pressure within defined limits as defined herein. Exemplary and non-limiting blowing agents include HFC-245fa (Honeywell Intl.), namely 1,1,1, 3,3 pentafluoropentane or HFO-1336mzz or sold under the trade name Opteon 1100 (Chemours), namely 1,1,1,4,4,4 hexafluoro-2-butene.

And while the above identified blowing agents are preferred from an ozone depletion potential (ODP) perspective as well as a global warming potential (GWP) perspective, the third stream within the spray gun offers the ability to use a myriad of blowing agents, alone or in combination with others, the combination in one aspect including all non-flammable blowing agents, while in another aspect including a combination of non-flammable and flammable blowing agents. A non-limiting list of other blowing agents includes, but is not limited to air, $C_1$ to $C_6$ hydrocarbons, $C_1$ to $C_8$ alcohols, ethers, diethers, aldehydes, ketones, hydrofluoroethers, $C_1$ to $C_4$ chlorocarbons, methyl formate, water, carbon dioxide, $C_3$ to $C_4$ hydrofluoroolefins, and $C_3$ to $C_4$ hydrochlorofluoroolefins. Examples of these non-exclusively include one or more of difluoromethane, trans-1,2-dichloroethylene, difluoroethane, 1,1,1,2,2-pentafluoroethane, 1,1,2,2-tetrafluoroethane, 1,1,1,2-tetrafluoroethane, 1,1, 1-trifluoroethane, 1,1-difluoroethane, fluoroethane, hexafluoropropane isomers, including HFC-236fa, pentafluoropropane isomers of HFC-245fa, heptafluoropropane isomers, including HFC-227ea, hexafluorobutane isomers, and pentafluorobutane isomers including HFC-365mfc, tetrafluoropropane isomers, and trifluoropropene isomers (HFO-1243). Specifically included are all molecules and isomers of HFO-1234, including 1,1,1,2-tetrafluoropropene (HFO-1234yf), trans-1-chloro-3,3,3-trifluoropropene (HFO-1233zd(E)) sold under the trade name Solstice LBP by Honeywell and cis- and trans-1,2,3,3-tetrafluoropropene (HFO-1234ye), HFC-1233zd, and HFC-1225ye. The blowing agents may be used in combination with at least one co-blowing agent which non-exclusively include: hydrocarbons, methyl formate, halogen containing compounds, especially fluorine containing compounds and chlorine containing compounds such as halocarbons, fluorocarbons, chlorocarbons, fluorochlorocarbons, halogenated hydrocarbons such as hydrofluorocarbons, hydrochlorocarbons, hydrofluorochlorocarbons, hydrofluoroolefins, hydrochlorofluoroolefins, $CO_2$, $CO_2$ generating materials such as water, and organic acids that produce $CO_2$ such as formic acid. Examples non-exclusively include low-boiling, aliphatic hydrocarbons such as ethane, propane(s), i.e. normal pentane, isopropane, isopentane and cyclopentane; butanes(s), i.e. normal butane and isobutane; ethers and halogenated ethers; trans 1,2-dichloroethylene, pentafluorobutane; pentafluoropropane; hexafluoropropane; and heptafluoropropane; 1-chloro-1,2,2,2-tetrafluoroethane (HCFC-124); and 1,1-dichloro-1-fluoroethane (HCFC-141b) as well as 1,1,2,2-tetrafluoroethane (HFC-134); 1,1,1,2-tetrafluoroethane (HFC-134a); 1-chloro 1,1-difluoroethane (HCFC-142b); 1,1,1,3,3-pentafluorobutane (HFC-365mfc); 1,1,1,2,3,3,3-heptafluoropropane (HCF-227ea); trichlorofluoromethane (CFC-11), dichlorodifluoromethane (CFC-12); 1,1,1,3,3,3-hexafluoropropane (HFC-236fa); 1,1,1,2,3,3-hexafluoropropane (HFC-236ea); difluoromethane (HFC-32); difluoroethane (HFC-152a); trifluoropropenes, pentafluoropropenes, chlorotrifluoropropenes, tetrafluoropropenes including 1,1,1,2-tetrafluoropropene (HFO-1234yf), 1,1,1,2,3-pentafluoropropene (HFO-1225ye), and 1-chloro-3,3,3-trifluoropropene (HCFC-1233zd). Combinations of any of the aforementioned are useful including blends and azeotropes thereof. The relative amount of any of the above noted additional co-blowing agents, as well as any additional components included in present compositions, can vary widely within the general broad scope of the present invention according to the particular application for the composition, and all such relative amounts are considered to be within the scope hereof.

As used herein, a non-limiting definition for the term "co-blowing agent" which includes mixtures or miscible blends and/or azeotropes of blowing agents, means a one or more co-blowing agents, co-propellants, or co-solvents which are useful and provide efficacy to various applications in the form of insulation performance, pressure performance, or solubility, without deleterious effect due to molar gas volume, flammability mitigation, or GWP reduction. These co-agents include but are not limited to those described previously.

The application will now be described in a non-limiting, exemplary, hypothetical series of examples as summarized in the following table in which the contents of the "C" stream represents the third stream content.

TABLE I

| | Water Partitioning | | | | | | | | |
|---|---|---|---|---|---|---|---|---|---|
| Reactant | Example #1 | | | Example #2 | | | Example #3 | | |
| Stream | A | B | C | A | B | C | A | B | C |
| pMDI | 94.0% | | | 94.0% | | | 94.0% | | |
| Voranol 360 | | 20.0% | | | 20.0% | | | 35.0% | |
| TB-350 | | 20.0% | 38.0% | | 20.0% | 20.0% | | 20.0% | 20.0% |
| TCPP | | 28.0% | 28.0% | | 28.0% | 28.0% | | 25.0% | 28.0% |
| PHT4-Diol | | 28.0% | | | 5.0% | 10.0% | | | 10.0% |
| Surfactant(s) | | 2.0% | 2.0% | | 2.0% | 2.0% | | | 2.0% |
| HFO | 6.0% | | 28.0% | 6.0% | | 40.0% | 6.0% | | 40.0% |
| Nitrogen/Air | | 200 psig | | | 200 psig | | | 200 psig | |
| Polycat ® 12 | | | 2.0% | | 1.5% | | | 1.0% | |
| Polycat ® 5 | | 2.0% | | | 1.5% | | | 2.5% | |
| Dabco ® T | | | | | | | | 1.5% | |
| Water | | 0.0% | | | 2.0% | | | 15.0% | |
| Total | 100% | 100% | 100% | 100% | 100% | 100% | 100% | 100% | 100% |

Example #1 illustrates the ability supplement the amount of polyols in the final composition by allocating a portion of the amount to both the "B" and "C" cylinders. The catalyst is added to both streams and the pressurizing agent for the "B" stream is nitrogen and/or air which obviously contains nitrogen, while the HFO blowing agent is only illustrated as being contained in the "A" and "C" cylinders. No added water is present in the reactants. When higher amounts of HFO are employed (see Example #2), as well as added water, the HFO blowing agent is preferably not added to the cylinders containing the blowing agent due to shelf life and performance characteristics. The addition of water has traditionally limited the type (and amounts) of catalysts employed in the reaction. Example #3 illustrates how this might impact the formulation.

TABLE II

Autocatalytic Polyols

| Reactant | Example #4 | | | Example #5 | | | Example #6 | | |
|---|---|---|---|---|---|---|---|---|---|
| Stream | A | B | C | A | B | C | A | B | C |
| pMDI | 88.0% | | | 88.0% | | | 88.0% | | |
| Carpol TEAP-265 | | 20.0% | | | | | | | |
| Jeffamine D-2000 | | | | | 20.0% | | | | |
| Poly-G ® 70-600 | | | | | | | 20.0% | | |
| TB-350 | | 30.0% | 23.0% | | 30.0% | 23.0% | | 30.0% | 23.0% |
| TCPP | | 35.0% | 35.0% | | 35.0% | 35.0% | | 35.0% | 35.0% |
| PHT4-Diol | | | 11.0% | | | 10.4% | | | 10.0% |
| Surfactant(s) | 2.0% | 2.0% | 2.0% | 2.0% | 2.0% | 2.0% | 2.0% | 2.0% | 2.0% |
| HFO | 10.0% | | 40.0% | 10.0% | | 40.0% | 10.0% | | 40.0% |
| Nitrogen/Air | | 200 psig | | | 200 psig | | | 200 psig | |
| Dabco ® 33 LV | | 0.5% | | | 0.5% | | | 0.5% | |
| Dabco ® T 120 | | 0.5% | | | 0.0% | | | 0.5% | |
| Dabco ® K-15 | | 1.0% | | | 1.1% | | | 0.0% | |
| Water | | 0.0% | | | 1.0% | | | 2.0% | |
| Total | 100% | 100% | 100% | 100% | 100% | 100% | 100% | 100% | 100% |

Examples #4-#6 illustrate the flexibility of the three-stream system when there is no HFO in the "B" cylinder stream, thereby permitting the use of catalysts which would normally not be usable with HFO blowing agents.

TABLE III

Polyether Polyols

| Reactants | Example #7 | | | Example #8 | | | Example #9 | | |
|---|---|---|---|---|---|---|---|---|---|
| Stream | A | B | C | A | B | C | A | B | C |
| pMDI | 84.0% | | | 84.0% | | | 84.0% | | |
| Voranol 360 | | 40.0% | | | 20.0% | | | 20.0% | |
| Poly-G ® 30-168 | | 20.0% | | | 20.0% | | | | |
| Poly-G ® 30-42 | | 10.0% | | | 10.0% | 10.0% | | 20.0% | |
| TB-350 | | | 30.0% | | 18.0% | 10.0% | | | 40.0% |
| TCPP | 10.0% | 20.0% | 27.0% | 10.0% | 32.0% | 47.0% | 10.0% | 45.0% | 12% |
| PHT4-Diol | | | | | 10.0% | | | 5.0% | 5.0% |
| Surfactant(s) | | 3.0% | 3.0% | | 3.0% | 3.0% | | 3.0% | 3.0% |
| HFO | 6.0% | | 36.0% | 6.0% | | 36.0% | 6.0% | | 36.0% |
| Nitrogen/Air | | 200 psig | | | 200 psig | | | 200 psig | |
| Polycat ® 12 | | 6.0% | | | 6.0% | | | 6.0% | |
| Polycat ® 5 | | | 2.0% | | | 2.0% | | | 2.0% |
| Dabco ® K-15 | | | 2.0% | | | 2.0% | | | 2.0% |
| Water | | 1.0% | | | 1.0% | | | 1.0% | |
| Total | 100% | 100% | 100% | 100% | 100% | 100% | 100% | 100% | 100% |

Examples #7-#9 illustrate the ability to employ various catalysts in different reactant streams when using HFO blowing agents.

TABLE IV

Miscellaneous

| Reactant | Example #10 | | | Example #11 | | | Example #12 | | |
|---|---|---|---|---|---|---|---|---|---|
| Stream | A | B | C | A | B | C | A | B | C |
| pMDI | 94.0% | | | 94.0% | | | 94.0% | | |
| Multranol 8114 | | | 30.0% | | | | | | 10.0% |
| Poly-G ® 37-600 | | | | | | | | | 10.0% |
| Poly-G ® 76-120 | | | 9.5% | | | | | | 10.0% |
| TB-350 | | 20.0% | | | 25.0% | 26.5% | | 20.0% | 38.0% |
| TCPP | | 25.0% | 40.0% | | 30.0% | 35.0% | | 35.0% | 25.0% |
| PHT4-Diol | | 15.0% | 15.0% | | 5.0% | 30.0% | | 5.0% | |
| Surfactant | | 2.0% | 2.0% | | | 4.0% | | | 4.0% |
| HFO | 6.0% | 40.0% | | 6.0% | 40.0% | | 6.0% | 40.0% | |
| Nitrogen/Air | | | 200 psig | | | 200 psig | | | 200 psig |
| Dabco ® T | | | 0.5% | | | 1.0% | | | |
| Polycat ® 5 | | | 0.5% | | | 0.5% | | | 1.0% |

TABLE IV-continued

| | Miscellaneous | | | | | | | | |
|---|---|---|---|---|---|---|---|---|---|
| Reactant | Example #10 | | | Example #11 | | | Example #12 | | |
| Stream | A | B | C | A | B | C | A | B | C |
| Dabco ® K-15 | | | 1.5% | | | 1.0% | | | 1.0% |
| Water | | | 1.0% | | | 2.0% | | | 1.0% |
| Total | 100% | 100% | 100% | 100% | 100% | 100% | 100% | 100% | 100% |

Examples #10-12 further illustrate the flexibility of the three-component system when it comes to composition of the reactants in each respective feed stream (cylinder).

Advantages of Third Stream Capability when Using HFOs as a Blowing Agent

HFOs, HydroFluoroOlefins, which contain a double bond are inherently unstable as evidenced in their low, below 10, global warming potentials. In comparison, the most commonly and currently used alkane HFC, HydroFluoroCarbon, 134a, has a GWP of approximately 1350. Due to HFO's relatively short atmospheric life time, it can be readily seen that their use in low pressure polyurethane spray and pour in place systems which are required to maintain desirable physical properties for a year's shelf life are problematic. These disposable and refillable systems must maintain yearlong shelf life stability while under pressure and exposed to high working temperatures.

Because of this instability, the formulator of such HFO blown systems, in comparison to established HFC blown systems, has been severely constrained as to which chemicals can be used in order to create a stable system. Of key importance is the deleterious effect of the following: established tertiary amine catalysts cannot be used; less aggressive (sterically hindered) catalysts must be substituted (this prevents the system from achieving a desirable quick cure time); polyol selection is constrained; polyether polyols cannot be used; autocatalytic (amine containing) polyols cannot be used; flame retardant loading is constrained; TCPP levels above 37% B-side blend by weight are deleterious, (presents potential problems for achieving acceptable flame ratings); water loading levels are constrained (water loading levels above 2% are deleterious); prevents the formulation of low density/open cell foams which have better yield.

Third stream capability will separate the incompatible raw material streams while allowing the use of the aforementioned and established raw materials commonly utilized to produce low pressure, two component polyurethane foam systems. This will allow for the return to standard practice.

Additionally, it is noted that when air and/or air/nitrogen mixtures are employed in the third stream, the surface characteristics of the blown foam are slightly different than when no third stream is used. Specifically, the ratio of "high" to "low" spots as measured by a calipers indicates that the value of the ratio is closer to 1, and hence, the "smoother" the surface. The decrease in the ratio is at least 5% closer to 1 than when no third stream is present, preferably at least 10% closer to 1 in comparison to no third stream . . . and in a more preferred embodiment, the decrease is at least 25% closer to 1 in comparison to no third stream being utilized.

Color-Changing Nozzles

The color-changing aspects of the invention above, use thermochromism which is typically implemented via one of two common approaches: liquid crystals and leuco dyes.

Liquid crystals are used in precision applications, as their responses can be engineered to accurate temperatures, but their color range is limited by their principle of operation. Leuco dyes allow wider range of colors to be used, but their response temperatures are more difficult to set with accuracy.

Some liquid crystals are capable of displaying different colors at different temperatures. This change is dependent on selective reflection of certain wavelengths by the crystalline structure of the material, as it changes between the low-temperature crystalline phase, through anisotropic chiral or twisted nematic phase, to the high-temperature isotropic liquid phase. Only the nematic mesophase has thermochromic properties. This restricts the effective temperature range of the material.

The twisted nematic phase has the molecules oriented in layers with regularly changing orientation, which gives them periodic spacing. The light passing through the crystal undergoes Bragg diffraction on these layers, and the wavelength with the greatest constructive interference is reflected back, which is perceived as a spectral color. A change in the crystal temperature can result in a change of spacing between the layers and therefore in the reflected wavelength. The color of the thermochromic liquid crystal can therefore continuously range from non-reflective (black) through the spectral colors to black again, depending on the temperature. Typically, the high temperature state will reflect blue-violet, while the low-temperature state will reflect red-orange. Since blue is a shorter wavelength than red, this indicates that the distance of layer spacing is reduced by heating through the liquid-crystal state.

Some such materials are cholesteryl nonanoate or cyanobiphenyls. Liquid crystals used in dyes and inks often come microencapsulated, in the form of suspension. Liquid crystals are used in applications where the color change has to be accurately defined.

Thermochromic dyes are based on mixtures of leuco dyes with suitable other chemicals, displaying a color change (usually between the colorless leuco form and the colored form) in dependence on temperature. The dyes are rarely applied on materials directly; they are usually in the form of microcapsules with the mixture sealed inside. An illustrative example would include microcapsules with crystal violet lactone, weak acid, and a dissociable salt dissolved in dodecanol; when the solvent is solid, the dye exists in its lactone leuco form, while when the solvent melts, the salt dissociates, the pH inside the microcapsule lowers, the dye becomes protonated, its lactone ring opens, and its absorption spectrum shifts drastically, therefore it becomes deeply violet. In this case the apparent thermochromism is in fact halochromism.

The dyes most commonly used are spirolactones, fluorans, spiropyrans, and fulgides. The weak acids include bisphenol A, parabens, 1,2,3-triazole derivates, and 4-hydroxycoumarin and act as proton donors, changing the dye molecule between its leuco form and its protonated colored form; stronger acids would make the change irreversible.

Leuco dyes have less accurate temperature response than liquid crystals. They are suitable for general indicators of approximate temperature. They are usually used in combination with some other pigment, producing a color change between the color of the base pigment and the color of the pigment combined with the color of the non-leuco form of the leuco dye. Organic leuco dyes are available for temperature ranges between about 23° F. (−5° C.) and about 140° F. (60° C.), in wide range of colors. The color change usually happens in about a 5.4° F. (3° C.) interval.

The size of the microcapsules typically ranges between 3-5 μm (over 10 times larger than regular pigment particles), which requires some adjustments to printing and manufacturing processes.

Thermochromic paints use liquid crystals or leuco dye technology. After absorbing a certain amount of light or heat, the crystalline or molecular structure of the pigment reversibly changes in such a way that it absorbs and emits light at a different wavelength than at lower temperatures.

The thermochromic dyes contained either within or affixed upon either the disposable nozzle or hoses may be configured to change the color of the composition in various ways. For example, in one embodiment, once the composition reaches a selected temperature, the composition may change from a base color to a white color or a clear color. In another embodiment, a pigment or dye that does not change color based on temperature may be present for providing a base color. The thermochromic dyes, on the other hand, can be included in order to change the composition from the base color to at least one other color.

In one particular embodiment, the plurality of thermochromic dyes are configured to cause the cleansing composition to change color over a temperature range of at least about 3° C., such as at least about 5° C., once the composition is heated to a selected temperature. For example, multiple thermochromic dyes may be present within the cleansing composition so that the dyes change color as the composition gradually increases in temperature. For instance, in one embodiment, a first thermochromic dye may be present that changes color at a temperature of from about 23° C. to about 28° C. and a second thermochromic dye may be present that changes color at a temperature of from about 27° C. to about 32° C. If desired, a third thermochromic dye may also be present that changes color at a temperature of from about 31° C. to about 36° C. In this manner, the cleansing composition changes color at the selected temperature and then continues to change color in a stepwise manner as the temperature of the composition continues to increase. It should be understood that the above temperature ranges are for exemplary and illustrative purposes only.

Any thermochromic substance that undergoes a color change at the desired temperature may generally be employed in the present disclosure. For example, liquid crystals may be employed as a thermochromic substance in some embodiments. The wavelength of light ("color") reflected by liquid crystals depends in part on the pitch of the helical structure of the liquid crystal molecules. Because the length of this pitch varies with temperature, the color of the liquid crystals is also a function of temperature. One particular type of liquid crystal that may be used in the present disclosure is a liquid crystal cholesterol derivative. Exemplary liquid crystal cholesterol derivatives may include alkanoic and aralkanoic acid esters of cholesterol, alkyl esters of cholesterol carbonate, cholesterol chloride, cholesterol bromide, cholesterol acetate, cholesterol oleate, cholesterol caprylate, cholesterol oleyl-carbonate, and so forth. Other suitable liquid crystal compositions are possible and contemplated within the scope of the invention.

In addition to liquid crystals, another suitable thermochromic substance that may be employed in the present disclosure is a composition that includes a proton accepting chromogen ("Lewis base") and a solvent. The melting point of the solvent controls the temperature at which the chromogen will change color. More specifically, at a temperature below the melting point of the solvent, the chromogen generally possesses a first color (e.g., red). When the solvent is heated to its melting temperature, the chromogen may become protonated or deprotonated, thereby resulting in a shift of the absorption maxima. The nature of the color change depends on a variety of factors, including the type of proton-accepting chromogen utilized and the presence of any additional temperature-insensitive chromogens. Regardless, the color change is typically reversible.

Although not required, the proton-accepting chromogen is typically an organic dye, such as a leuco dye. In solution, the protonated form of the leuco dye predominates at acidic pH levels (e.g., pH of about 4 or less). When the solution is made more alkaline through deprotonation, however, a color change occurs. Of course, the position of this equilibrium may be shifted with temperature when other components are present. Suitable and non-limiting examples of leuco dyes for use in the present disclosure may include, for instance, phthalides; phthalanes; substituted phthalides or phthalanes, such as triphenylmethane phthalides, triphenylmethanes, or diphenylmethanes; acyl-leucomethylene blue compounds; fluoranes; indolylphthalides, spiropyranes; cumarins; and so forth. Exemplary fluoranes include, for instance, 3,3'-dimethoxyfluorane, 3,6-dimethoxyfluorane, 3,6-di-butoxyfluorane, 3-chloro-6-phenylamino-flourane, 3-diethylamino-6-dimethylfluorane, 3-diethylamino-6-methyl-7-chlorofluorane, and 3-diethyl-7,8-benzofluorane, 3,3'-bis-(p-dimethyl-aminophenyl)-7-phenylaminofluorane, 3-diethylamino-6-methyl-7-phenylamino-fluorane, 3-diethylamino-7-phenyl-aminofluorane, and 2-anilino-3-methyl-6-diethylamino-fluorane. Likewise, exemplary phthalides include 3,3',3"-tris(p-dimethylamino-phenyl)phthalide, 3,3'-bis(p-dimethyl-aminophenyl)phthalide, 3,3-bis(p-diethyl-amino-phenyl)-6-dimethylamino-phthalide, 3-(4-diethylaminophenyl)-3-(1-ethyl-2-methylindol-3-yl)phthalide, and 3-(4-diethylamino-2-methyl)phenyl-3-(1,2-dimethylindol-3-yl)phthalide.

Although any solvent for the thermochromic dye may generally be employed in the present disclosure, it is typically desired that the solvent have a low volatility. For example, the solvent may have a boiling point of about 150° C. or higher, and in some embodiments, from about 170° C. to 280° C. Likewise, the melting temperature of the solvent is also typically from about 25° C. to about 40° C., and in some embodiments, from about 30° C. to about 37° C. Examples of suitable solvents may include saturated or unsaturated alcohols containing about 6 to 30 carbon atoms, such as octyl alcohol, dodecyl alcohol, lauryl alcohol, cetyl alcohol, myristyl alcohol, stearyl alcohol, behenyl alcohol, geraniol, etc.; esters of saturated or unsaturated alcohols containing about 6 to 30 carbon atoms, such as butyl stearate, methyl stearate, lauryl laurate, lauryl stearate, stearyl laurate, methyl myristate, decyl myristate, lauryl myristate, butyl stearate, lauryl palmitate, decyl palmitate, palmitic acid glyceride, etc.; azomethines, such as benzylideneaniline, benzylidenelaurylamide, o-methoxybenzylidene laurylamine, benzylidene p-toluidine, p-cumylbenzylidene, etc.; amides, such as acetamide, stearamide, etc.; and so forth.

The thermochromic composition may also include a proton-donating agent (also referred to as a "color developer") to facilitate the reversibility of the color change. Such proton-donating agents may include, for instance, phenols, azoles, organic acids, esters of organic acids, and salts of organic acids. Exemplary phenols may include phenylphenol, bisphenol A, cresol, resorcinol, chlorolucinol, b-naphthol, 1,5-dihydroxynaphthalene, pyrocatechol, pyrogallol, trimer of p-chlorophenol-formaldehyde condensate, etc. Exemplary azoles may include benzotriaoles, such as 5-chlorobenzotriazole, 4-laurylaminosulfobenzotriazole, 5-butylbenzotriazole, dibenzotriazole, 2-oxybenzotriazole, 5-ethoxycarbonylbenzotriazole, etc.; imidazoles, such as oxybenzimidazole, etc.; tetrazoles; and so forth. Exemplary organic acids may include aromatic carboxylic acids, such as salicylic acid, methylenebissalicylic acid, resorcylic acid, gallic acid, benzoic acid, p-oxybenzoic acid, pyromellitic acid, b-naphthoic acid, tannic acid, toluic acid, trimellitic acid, phthalic acid, terephthalic acid, anthranilic acid, etc.; aliphatic carboxylic acids, such as stearic acid, 1,2-hydroxystearic acid, tartaric acid, citric acid, oxalic acid, lauric acid, etc.; and so forth. Exemplary esters may include alkyl esters of aromatic carboxylic acids in which the alkyl moiety has 1 to 6 carbon atoms, such as butyl gallate, ethyl p-hydroxybenzoate, methyl salicylate, etc.

The amount of the proton-accepting chromogen employed may generally vary, but is typically from about 2 wt. % to about 20 wt. %, and in some embodiments, from about 5 to about 15 wt. % of the thermochromic substance. Likewise, the proton-donating agent may constitute from about 5 to about 40 wt. %, and in some embodiments, from about 10 wt. % to about 30 wt. % of the thermochromic substance. In addition, the solvent may constitute from about 50 wt. % to about 95 wt. %, and in some embodiments, from about 65 wt. % to about 85 wt. % of the thermochromic composition.

Regardless of the particular thermochromic substance employed, it may be microencapsulated to enhance the stability of the substance during processing. For example, the thermochromic substance may be mixed with a thermosetting resin according to any conventional method, such as interfacial polymerization, in-situ polymerization, etc. The thermosetting resin may include, for example, polyester resins, polyurethane resins, melamine resins, epoxy resins, diallyl phthalate resins, vinylester resins, and so forth. The resulting mixture may then be granulated and optionally coated with a hydrophilic macromolecular compound, such as alginic acid and salts thereof, carrageenan, pectin, gelatin and the like, semisynthetic macromolecular compounds such as methylcellulose, cationized starch, carboxymethylcellulose, carboxymethylated starch, vinyl polymers (e.g., polyvinyl alcohol), polyvinylpyrrolidone, polyacrylic acid, polyacrylamide, maleic acid copolymers, and so forth. The resulting thermochromic microcapsules typically have a size of from about 1 to about 50 micrometers, and in some embodiments, from about 3 to about 15 micrometers. Various other microencapsulation techniques may also be used.

Thermochromic dyes are commercially available from various sources. In one embodiment, for instance, thermochromic dyes marketed by Chromadic Creations, Hamilton, Ontario and sold under the trade name SpectraBurst Thermochromic Polypropylene.

The thermochromic dyes can be present in the composition in an amount sufficient to have a visual effect on the color of the composition. The amount or concentration of the dyes can also be increased or decreased depending upon the desired intensity of any color. In general, the thermochromic dyes may be present in the composition in an amount from about 0.01% by weight to about 9% by weight, such as from about 0.1% by weight to about 3% by weight. For instance, in one particular embodiment, the thermochromic dyes may be present in an amount from about 0.3% to about 1.5% by weight.

As described above, thermochromic dyes typically change from a specific color to clear at a certain temperature, e.g., dark blue below 60° F. (15.6° C.) to transparent or translucent above 60° F. (15.6° C.). If desired, other pigments or dyes can be added to the composition in order to provide a background color that remains constant independent of the temperature of the composition. By adding other pigments or dyes in combination with the thermochromic dyes to the composition, the thermochromic dyes can provide a color change at certain temperatures rather than just a loss of color should the thermochromic dye become clear. For instance, a non-thermochromic pigment, such as a yellow pigment, may be used in conjunction with a plurality of thermochromic dyes, such as a red dye and a blue dye. When all combined together, the cleansing composition may have a dark color. As the composition is increased in temperature, the red thermochromic dye may turn clear changing the color to a green shade (a combination of yellow and blue). As the temperature further increases, the blue thermochromic dye turns clear causing the composition to turn yellow.

It should be understood, that all different sorts of thermochromic dyes and non-thermochromic pigments and dyes may be combined in order to produce a composition having a desired base color and one that undergoes desired color changes. The color changes, for instance, can be somewhat dramatic and fanciful. For instance, in one embodiment, the composition may change from green to yellow to red.

In an alternative embodiment, however, the composition can contain different thermochromic dyes all having the same color. As the temperature of the composition is increased, however, the shade or intensity of the color can change. For instance, the composition can change from a vibrant blue to a light blue to a clear color.

In addition to the above, it should be understood that many alterations and permutations are possible. Any of a variety of colors and shades can be mixed in order to undergo color changes as a function of temperature.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of dispensing foam from a foam spray gun, the method comprising the steps of:
   providing an "A-side" diisocyanate at a first input hose pressurized between 130-250 psi, the first input hose being in fluid communication with a removable nozzle of the foam spray gun;

providing a "B-side" polyol at a second input hose pressurized between 130-250 psi, the second input hose being in fluid communication with the removable nozzle;

providing at least one catalyst at a third input hose, the third input hose in fluid communication with the removable nozzle, the catalyst selected from the group consisting of metal esters, primary amines, secondary amines, tertiary amines, the amines further comprising oxygen, and alkylmetal mercaptides, the at least one catalyst entering the third input hose at a pressure no greater than 250 psi;

initially adding the at least one catalyst to at least the "B-side" polyol and a hydrofluoroolefin blowing agent at the removable nozzle such that the use of the third input hose eliminates "B-side" catalysts from the "B-side" polyol and catalysts from the hydrofluoroolefin blowing agent upstream of the removable nozzle, the addition of the at least one catalyst through the third input hose into the removable nozzle increasing a shelf life to at least one year for a synthesized polyurethane foam; and controlling, via at least a control mechanism at the foam spray gun, dispensing of the at least one catalyst from the third input hose into the removable nozzle simultaneous to dispensing the "B-side" polyol from the second input hose into the removable nozzle and the "A-side" diisocyanate from the first input hose into the removable nozzle such that a combination of the "B-side" polyol and the "A-side" diisocyanate in addition to the at least one catalyst forms a polyurethane foam.

2. The method of claim 1, wherein the foam spray gun is a plastic foam spray gun that includes a housing having a front and a rear, and wherein the removable nozzle is at the front of the housing.

3. The method of claim 1, wherein all of the added catalyst is through the third input hose.

4. The method of claim 3, wherein all of the added catalyst is at least two different catalysts.

5. The method of claim 4, wherein all of the added catalyst is at least three different catalysts.

6. The method of claim 1, further comprising:
changing a color of the removable nozzle as a result of a temperature change at the removable nozzle.

7. The method of claim 1, wherein the first input hose and the second input hose are each upwardly canted to enter the foam spray gun from on top of a housing of the foam spray gun.

8. The method of claim 1, wherein the at least one catalyst comprises a tertiary amine catalyst.

9. The method of claim 1, wherein the at least one catalyst is not sterically hindered.

10. The method of claim 1, wherein the polyol is a polyether polyol.

11. The method of claim 1, wherein the polyol is an autocatalytic amine-containing polyol.

12. The method of claim 1, wherein a concentration of water loading level is about 2 weight percent.

13. A method of dispensing foam from a foam spray gun, the method comprising the steps of:
providing an "A-side" diisocyanate at a first input hose pressurized between 130-250 psi, the first input hose being in fluid communication with a removable nozzle of the foam spray gun;

providing a "B-side" polyol at a second input hose pressurized between 130-250 psi, the second input hose being in fluid communication with the removable nozzle;

providing a hydrofluoroolefin blowing agent for said "A-side" and said "B-side";

providing at least one catalyst at a third input hose, the third input hose in fluid communication with the removable nozzle, the catalyst selected from the group consisting of metal esters, primary amines, secondary amines, tertiary amines, the amines further comprising oxygen, and alkylmetal mercaptides, the at least one catalyst entering the third input hose at a pressure no greater than 250 psi;

initially adding the at least one catalyst to at least the "B-side" polyol and the hydrofluoroolefin blowing agent at the removable nozzle such that the use of the third input hose eliminates "B-side" catalysts from the "B-side" polyol and catalysts from the hydrofluoroolefin blowing agent upstream of the removable nozzle, the addition of the at least one catalyst through the third input hose into the removable nozzle increasing a shelf life to at least one year for a synthesized polyurethane foam; and controlling, via at least a control mechanism at the foam spray gun, dispensing of the at least one catalyst from the third input hose into the removable nozzle simultaneous to dispensing the "B-side" polyol from the second input hose into the removable nozzle and the "A-side" diisocyanate from the first input hose into the removable nozzle such that a combination of the "B-side" polyol and the "A-side" diisocyanate in addition to the at least one catalyst forms a polyurethane foam.

14. The method of claim 13, wherein the foam spray gun is a plastic foam spray gun that includes a housing having a front and a rear, and wherein the removable nozzle is at the front of the housing.

15. The method of claim 13, wherein all of the added catalyst is through the third input hose.

16. The method of claim 15, wherein all of the added catalyst is at least two different catalysts.

17. The method of claim 16, wherein all of the added catalyst is at least three different catalysts.

18. The method of claim 13, further comprising:
changing a color of the removable nozzle as a result of a temperature change at the removable nozzle.

* * * * *